(12) United States Patent
Kelly et al.

(10) Patent No.: US 9,148,392 B1
(45) Date of Patent: Sep. 29, 2015

(54) SYSTEMS AND METHODS FOR AGGREGATING EVENT INFORMATION

(75) Inventors: John P. Kelly, Seattle, WA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 830 days.

(21) Appl. No.: 13/397,601

(22) Filed: Feb. 15, 2012

(51) Int. Cl.
*G06F 15/16* (2006.01)
*H04L 12/18* (2006.01)
*H04L 12/58* (2006.01)

(52) U.S. Cl.
CPC .............. *H04L 51/00* (2013.01); *H04L 12/189* (2013.01)

(58) Field of Classification Search
CPC ...... H04L 51/00; H04L 63/102; H04L 65/403
USPC .......................................................... 709/204
See application file for complete search history.

(56) References Cited

U.S. PATENT DOCUMENTS

2010/0180001 A1* 7/2010 Hardt ............................ 709/207
2013/0005405 A1* 1/2013 Prociw .......................... 455/566

OTHER PUBLICATIONS

Rabbath Mohamad et al.; Automatic Creation of Photo Books from Stories in Social Media; WSM 2010 Proceedings of Second ACM SIGMM Workshop on Social Media; 2010.
Ishan; Automatically Organize Photos by Events; http://www.ilovefreesoftware.com/26/windows/image-photo/automatically-organizephotos-by-events.html; Jan. 26, 2011.
Brand Networks Inc.; Social PIX; http://www.brandnetworksinc.com/social_toolbox/socialpix.php; Jan. 28, 2011.
Philipp Sandhaus et al.; Employing Aesthetic Principles for Automatic Photo Book Layout; OFFIS—Institute for Information Technology; Jan. 13, 2011.

* cited by examiner

*Primary Examiner* — Hua Fan
(74) *Attorney, Agent, or Firm* — ALG Intellectual Property, LLC (57) ABSTRACT

A computer-implemented method for aggregating event information may include 1) identifying a plurality of social networking data feeds, 2) identifying a time and a location of an event involving at least one person associated with at least one social networking data feed within the plurality of social networking data feeds, 3) mining the plurality of social networking data feeds for event data about the event, and 4) creating an event document from the event data to describe the event. Various other methods, systems, and computer-readable media are also disclosed.

20 Claims, 7 Drawing Sheets

SYSTEMS AND METHODS FOR AGGREGATING EVENT INFORMATION

BACKGROUND

In the information age, people increasingly organize their lives online, store their information in cloud-based applications, and connect with other people via social networking platforms. In some cases, entire events may be planned and/or recorded through social networking platforms. For example, friends may coordinate events online through electronic invitations, calendaring applications, or simply by posting messages. These friends may then use social networking platforms to "check in" at the events, store and/or share pictures and/or videos of the events, and/or post about the events before, during, and/or after the events.

Unfortunately, traditional social networking platforms may give only a narrow and fleeting view of events. For example, multiple people may chronicle an event using a variety of social networking platforms, but a social networking feed corresponding to a single person on a single social networking platform may only reflect a fraction of the data generated about the event, and that data may quickly become buried by new information in the social networking feed. Accordingly, the instant disclosure identifies and addresses a need for systems and methods for aggregating event information.

SUMMARY

As will be described in greater detail below, the instant disclosure generally relates to systems and methods for aggregating event information by mining information relating to an identified event (e.g., based on a determined time and location of the vent) from disparate social networking data feeds and combining the information into a unified document. In one example, a computer-implemented method for aggregating event information may include 1) identifying a plurality of social networking data feeds, 2) identifying a time and a location of an event involving at least one person associated with at least one social networking data feed within the plurality of social networking data feeds, 3) mining the plurality of social networking data feeds for event data about the event, and 4) creating an event document from the event data to describe the event.

In some examples, identifying the plurality of social networking data feeds may include 1) identifying at least one participant in the event and 2) identifying at least one personal social networking feed associated with the participant. In these examples, identifying the personal social networking feed associated with the participant may include 1) identifying a root social networking feed and 2) mining the root social networking feed for the personal social networking feed associated with the participant.

In one example, identifying the time and the location of the event may include mining the time and the location of the event from at least one social networking data feed within the plurality of social networking data feeds. In another example, identifying the time and the location of the event may include identifying the time and location of the event within at least one of 1) an event invitation defined by a social networking platform used for at least one of the plurality of social networking data feeds, 2) a calendar event defined by the social networking platform, and 3) an event announcement defined by the social networking platform.

The event data may include any of a variety of data. For example, the event data may include 1) a social networking check-in at the event, 2) a picture taken at the event, 3) a video taken at the event, 4) a social networking post created at the event, and/or 5) a social networking post created about the event. In some examples, mining the plurality of social networking data feeds for event data may include 1) mining a private social networking data feed for the event data and 2) mining at least one public social networking data feed for the event data. In some embodiments, creating the event document may include posting the event data to at least one social networking site.

In one embodiment, a system for implementing the above-described method may include 1) a feed module programmed to identify a plurality of social networking data feeds, 2) an identification module programmed to identify a time and a location of an event involving at least one person associated with at least one social networking data feed within the plurality of social networking data feeds, 3) a mining module programmed to mine the plurality of social networking data feeds for event data about the event, and 4) a creation module programmed to create an event document from the event data to describe the event. The system may also include at least one processor configured to execute the feed module, the identification module, the mining module, and the creation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a plurality of social networking data feeds, 2) identify a time and a location of an event involving at least one person associated with at least one social networking data feed within the plurality of social networking data feeds, 3) mine the plurality of social networking data feeds for event data about the event, and 4) create an event document from the event data to describe the event.

As will be explained in greater detail below, by mining information relating to an identified event (e.g., based on a determined time and location of the event) from disparate social networking data feeds and combining the information into a unified document, the systems and methods described herein may leverage existing social networking activity to thoroughly and automatically chronicle events.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
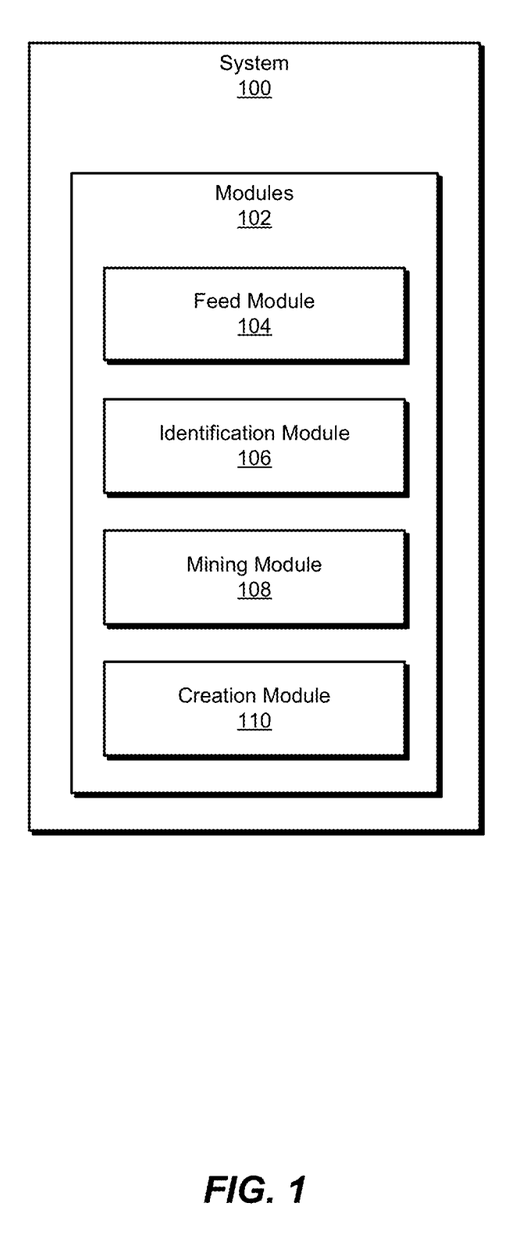
FIG. 1 is a block diagram of an exemplary system for aggregating event information.
Figure 2:
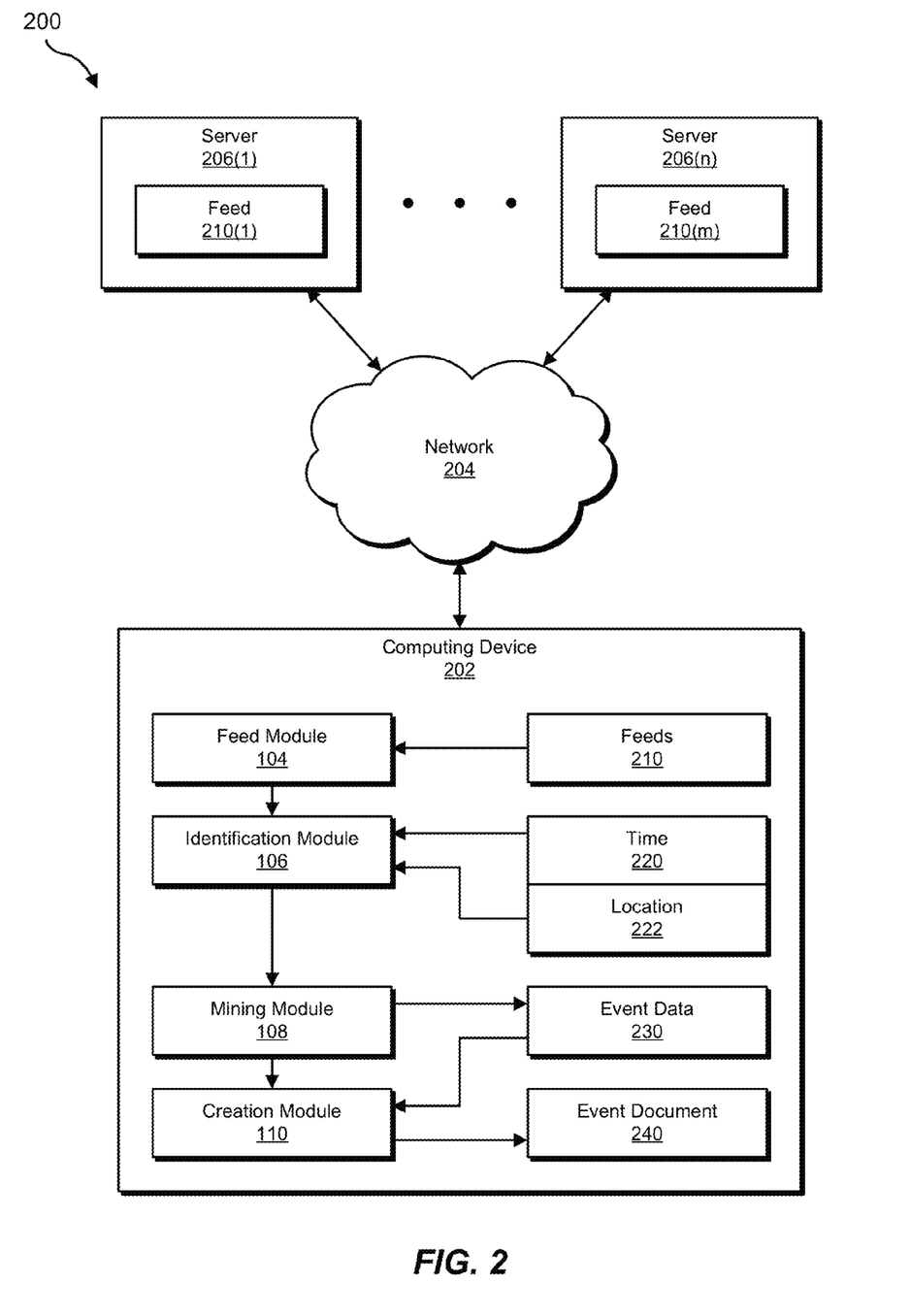
FIG. 2 is a block diagram of an exemplary system for aggregating event information.

The following will provide, with reference to FIGS. 1-2, detailed descriptions of exemplary systems for aggregating event information. Detailed descriptions of corresponding computer-implemented methods will also be provided in connection with FIG. 3. Detailed descriptions of exemplary social networking feeds and an exemplary event document will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for aggregating event information. As illustrated in this figure, exemplary system 100 may include one or more modules 102 for performing one or more tasks. For example, and as will be explained in greater detail below, exemplary system 100 may include a feed module 104 programmed to identify a plurality of social networking data feeds. Exemplary system 100 may also include an identification module 106 programmed to identify a time and a location of an event involving at least one person associated with at least one social networking data feed within the plurality of social networking data feeds.

In addition, and as will be described in greater detail below, exemplary system 100 may include a mining module 108 programmed to mine the plurality of social networking data feeds for event data about the event. Exemplary system 100 may also include a creation module 110 programmed to create an event document from the event data to describe the event. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or servers 206(1)-(n)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) via a network 204 (e.g., to mine social networking feed data from servers 206(1)-(n)).

In one embodiment, feed module 104, identification module 106, mining module 108, and/or creation module 110 may, when executed by at least one processor of computing device 202, facilitate computing device 202 in aggregating event information. For example, and as will be described in greater detail below, one or more of modules 102 may cause computing device 202 to 1) identify social networking data feeds 210 (e.g., feeds 210(1)-(m)), 2) identify a time 220 and a location 222 of an event involving at least one person associated with at least one social networking data feed within feeds 210, 3) mine feeds 210 for event data 230 about the event, and 4) create an event document 240 from event data 230 to describe the event.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Servers 206(1)-(n) generally represent any type or form of computing device that is capable of receiving, generating, hosting, processing, and/or providing social networking feed data. Examples of servers 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and servers 206(1)-(n).

Figure 3:
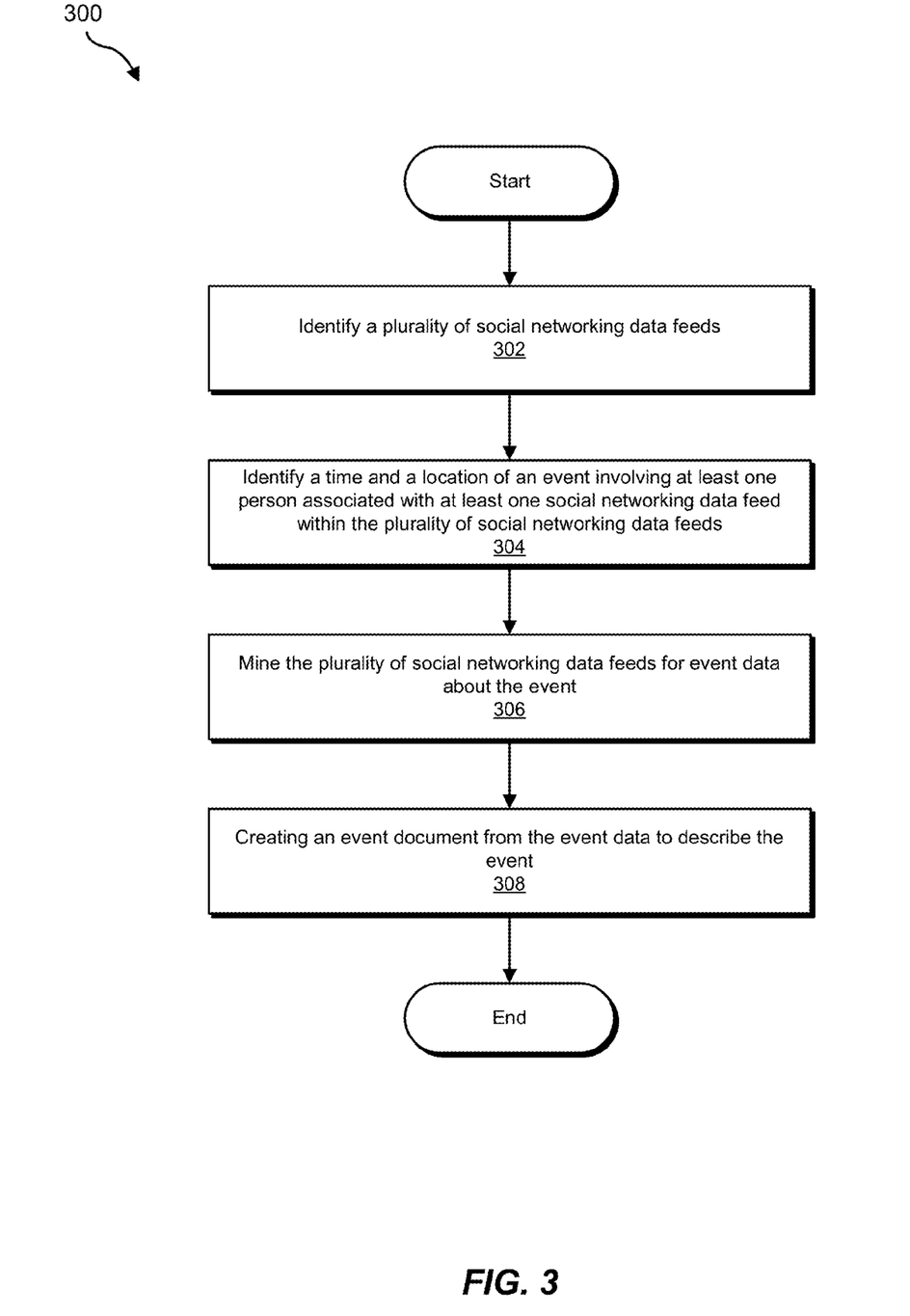
FIG. 3 is a flow diagram of an exemplary method for aggregating event information.

FIG. 3 is a flow diagram of an exemplary computer-implemented method 300 for aggregating event information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a plurality of social networking data feeds. For example, at step 302 feed module 104 may, as part of computing device 202 in FIG. 2, identify social networking data feeds 210 (e.g., feeds 210(1)-(m)).

As used herein, the phrase "social networking data" may refer to any stored by, generated by, organized by, managed by, processed by, and/or provided by a social networking platform. As used herein, the phrase "social networking platform" may refer to any service, platform, and/or Internet site that manages social connections and/or shares, compiles, formats, and/or broadcasts information based on social connections. Examples of social networking platforms may include FACEBOOK, TWITTER, GOOGLE+, LINKEDIN, and FLICKR. In some examples, the phrase "social networking data" may also refer to data hosted by cloud-based applications (e.g., web-based email clients, online calendar applications, online picture albums, etc.) for personal and/or private use.

As used herein, the term "feed" may refer to any data format providing updated content related to a subject (e.g., a person, a topic, an organization, etc.). Additionally or alternatively, the term "feed" may refer to a list and/or aggregation of such updates over time. In some examples, the term "feed" may refer to a human-readable feed (e.g., an Internet resource for displaying recent content associated with the feed). Additionally or alternatively, the term "feed" may refer to a computer-readable feed (e.g., an XML document including a list of data objects).

Accordingly, the phrase "social networking data feed" may refer to any feed of social networking data. In some examples, a social networking data feed may include a public feed. For example, a public social networking data feed and/or the contents thereof may be publicly accessible. Additionally or alternatively, a social networking data feed may include a private feed. For example, access to a private social networking data feed may be restricted to a specified list of users, a specified category of users (e.g., members of a social networking site, users within a certain distance on a social networking relationship graph, etc.), or even exclusively to the owner and/or creator of the private social networking data feed.

In some examples, the plurality of social networking data feeds may include social networking data feeds that are created, controlled, owned, and/or managed by a single user but correspond to multiple separate social networking data platforms (e.g., one user's FACEBOOK and FLICKR accounts). Additionally or alternatively, the plurality of social networking data feeds may include social networking data feeds that are created, controlled, owned, and/or managed by separate users but correspond to the same social networking data platform (e.g., various users' FACEBOOK accounts). In some examples, the plurality of social networking data feeds may include social networking data feeds that are created, controlled, owned, and/or managed by separate users and correspond to multiple separate social networking data platforms.

Feed module 104 may identify the plurality of social networking data feeds in any of a variety of ways. For example, feed module 104 may read a configuration file and/or receive an input designating one or more of the plurality of social networking data feeds. In some examples, feed module 104 may identify one or more of the plurality of social networking data feeds by monitoring browsing activity (e.g., as a part of a browser plug-in) and identifying an interaction with a social networking data platform.

In some examples, feed module 104 may identify one or more of the plurality of social networking data feeds by identifying at least one participant in an event and then identifying at least one personal social networking feed associated with the participant (e.g., created, controlled, owned, managed by, and/or containing information about the participant). As will be explained in greater detail below, in some examples one or more of the systems described herein may identify an event. In some examples, these systems and methods may first identify the event and then identify one or more of the plurality of social networking data feeds based on the event. Additionally or alternatively, feed module 104 may identify the event and then identify one or more of the plurality of social networking data feeds based on the event. In some examples, feed module 104 may iteratively construct a list of the plurality of social networking data feeds and a view of the event by using a working list of social networking data feeds to gather information about a possible event and using the gathered information to find additional potentially related social networking data feeds.

Feed module 104 may identify the personal social networking feed associated with the participant in any of a variety of ways. For example, feed module 104 may identify a root social networking feed and the mine the root social networking feed for the personal social networking feed associated with the participant. For example, feed module 104 may identify the root social networking feed by identifying a social networking feed owned by a user who has requested an event document from one or more of the systems described herein, for whom an event document is to be constructed by these systems, and/or who has allowed access by these systems to the root social networking feed. Feed module 104 may then mine the root social networking feed for the participant (and any other participants) by identifying contributions to the feed by the participant and/or references to the participant in the feed. Additionally or alternatively, feed module 104 may mine the root social networking feed by accessing a list of contacts, friends, and/or connections from a social networking platform corresponding to the root social networking feed.

Figure 4:
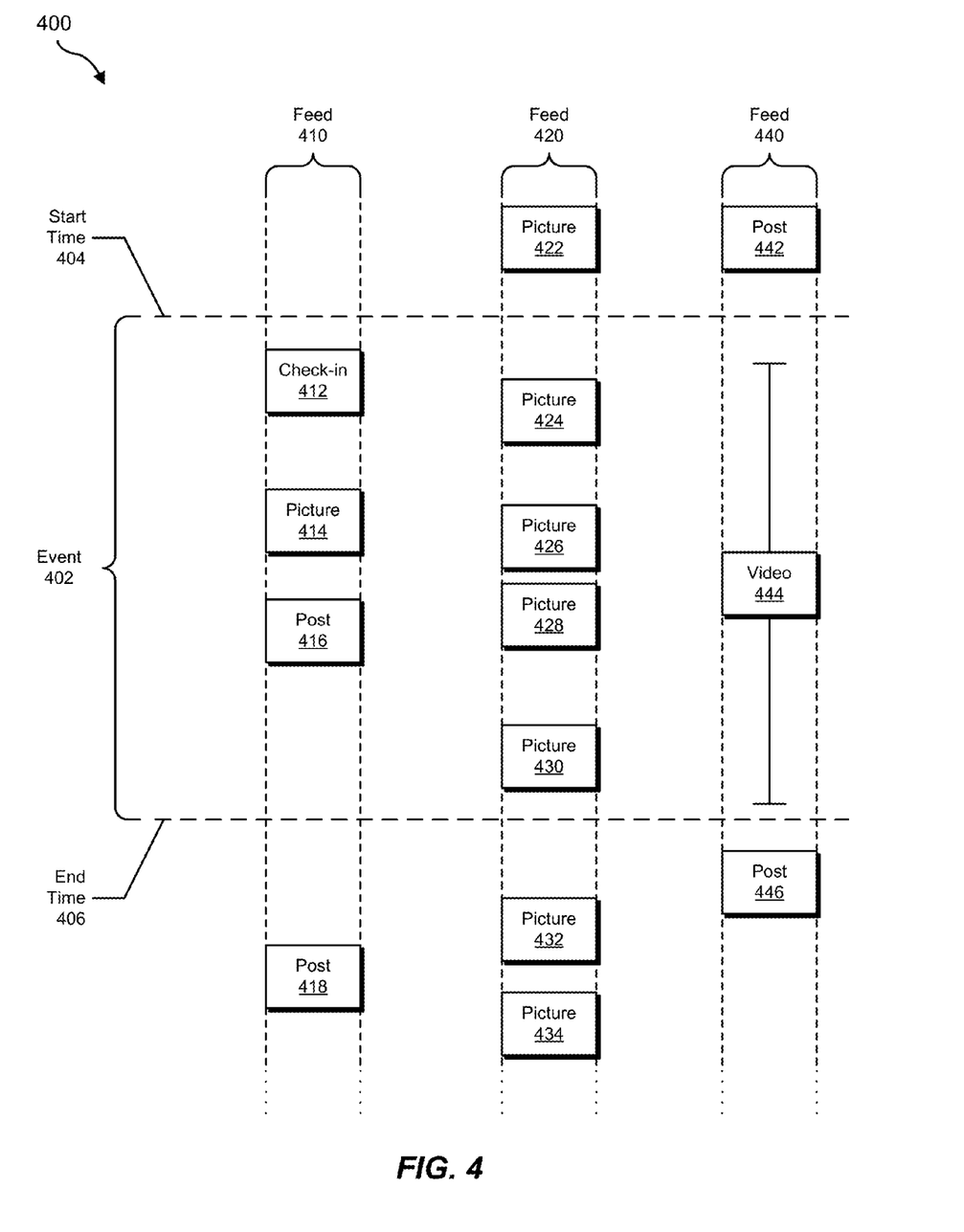
FIG. 4 is a diagram of exemplary social networking feeds.

FIG. 4 illustrates an exemplary set of feeds 400. As shown in FIG. 4, exemplary feeds 400 may include a feed 410, a feed 420, and a feed 440. Using FIG. 4 as an example, at step 302 feed module 104 may identify feeds 400.

Returning to FIG. 3, at step 304 one or more of the systems described herein may identify a time and a location of an event involving at least one person associated with at least one social networking data feed within the plurality of social networking data feeds. For example, at step 304 identification module 106 may, as part of computing device 202 in FIG. 2, identify a time 220 and a location 222 of an event involving at least one person associated with at least one social networking data feed within feeds 210.

Identification module 106 may identify the time and the location of the event in any of a variety of ways. For example, identification module 106 may mine the time and the location of the event from at least one social networking data feed within the plurality of social networking data feeds. For example, identification module 106 may parse one or more textual posts within the plurality of social networking data feeds to identify a time and/or a location that textually appears to correspond to an event. Additionally or alternatively, identification module 106 may examine metadata corresponding to one or more submissions within the plurality of social networking data feeds that are clustered by time and location to infer an event.

In some examples, identification module 106 may identify the time and location of the event within structured data provided by a social networking platform. For example, identification module 106 may access an application programming interface of a social networking platform to retrieve structure data capable of defining and/or partially defining an event. For example, identification module 106 may identify the time and/or location of the event within an event invitation defined by a social networking platform used for at least one of the plurality of social networking data feeds. Additionally or alternatively, identification module 106 may identify the time and/or location within a calendar event defined by the social networking platform. In this example, identification module 106 may identify the time and/or location within multiple calendar events corresponding to different users. In some examples, identification module 106 may identify the time and/or location within an event announcement defined by the social networking platform. Additionally or alternatively, identification module 106 may identify the time and/or the location of the event by receiving input (e.g., from a user requesting the creation of an event document) specifying the time and/or the location.

Identification module 106 may identify the time in any suitable format and with a variety of possible levels of precision and/or accuracy. For example, identification module 106 may identify the starting time of the event, an estimated starting time of the event (e.g., with a range of possible starting times and/or a margin of error for the starting time), a duration of the event, an estimated duration of the event, an ending time of the event, and/or an estimated ending time of the event. In some examples, identification module 106 may estimate (and/or revise estimates of) the starting time of the event and/or the ending time of the event based on the content of one or more of the social networking data feeds. For example, identification module 106 may identify a stated time of the event as "6:00 pm to 9:00 pm" based on calendar information. Identification module 106 may then revise the time of the event based on feed activity from the location of the event (e.g., extending the ending time of the event to 11:30 pm instead of 9:00 pm). In some examples, identification module 106 may estimate the duration of the event by determining a type of the event (e.g., estimating more than 24 hours for a camping trip but estimating a few hours for a sports watching party). Generally, identification module 106 may use any of the above techniques and/or any other techniques in any combination—e.g., using any suitable weightings, heuristics, and/or algorithms to evaluate all factors in total.

Using FIG. 4 as an example, identification module 106 may determine that an event 402 has a start time 404 and an end time 406. In some examples, identification module 106 may determine that event 402 has a start time 404 and an end time 406 based on user input. Additionally or alternatively, identification module 106 may determine that event 402 has a start time 404 and an end time 406 based on an event announcement and/or a calendar event defined within a social networking platform of one or more of feeds 410, 420, and 440. In some examples, identification module 106 may determine that event 402 has a start time 404 and an end time 406 based on the contents of one or more of feeds 410, 420, and 440. For example, identification module 106 may identify one or more past posts in feeds 410, 420, and 440 specifying start time 404 and/or end time 406. Additionally or alternatively, identification module 106 may determine that event 402 has an approximate start time of start time 404 based on a check-in 412 in feed 410 representing a first check-in to the event. In an additional example, identification module 106 may determine that event 402 has an approximate start time 404 and end time 406 based on determining that a picture 414, a post 416, a picture 426, a picture 428, a picture 430, and a video 444 were submitted to their respective feeds from the location of the event.

Identification module 106 may identify the location in any suitable format and with a variety of possible levels of precision and/or accuracy—for example, using any techniques analogous to the techniques described above by which identification module 106 may identify the time of the event. For example, identification module 106 may identify an address of the event, a geolocation of the event, a named location of the event (e.g., "Andre's house," "Rocket Park," "Town Lake," etc.) and/or any other location information pertaining to the event. In some examples, identification module 106 may assign estimated boundaries of the event based on an address and/or named location of the event in combination with map data (e.g., identifying the boundaries of a property based on map data corresponding to the address). Additionally or alternatively, identification module 106 may assign an estimated radius to the event based on determining the event venue type (e.g., a house, a park, a convention center, etc.) and/or the number of observed and/or estimated attendees. In some examples, identification module 106 may estimate (and/or revise estimates of) the location of the event based on the content of one or more of the social networking data feeds. For example, identification module 106 may observe the locations from which social networking feed events were submitted by apparent event participants (e.g., based on accepted invitations, references to the event in the submissions, etc.) and adjust the estimate of the central location and/or an estimated radius based on these inputs. Generally, identification module 106 may use any of the above techniques and/or any other techniques in any combination—e.g., using any suitable weightings, heuristics, and/or algorithms to evaluate all factors in total.

Returning to FIG. 3, at step 306 one or more of the systems described herein may mine the plurality of social networking data feeds for event data about the event. For example, at step 306 mining module 108 may, as part of computing device 202 in FIG. 2, mine feeds 210 for event data 230 about the event.

As mentioned earlier, the social networking data feeds may include human-readable feeds and/or computer-readable feeds. Accordingly, as used herein the term "mining" may refer to any suitable data mining technique for human-readable data and/or computer-readable data.

Mining module 108 may mine the plurality of social networking data feeds for event data in any of a variety of ways. For example, mining module 108 may identify one or more submissions to social networking data feeds within the plurality that correspond to the time and location of the event. For example, mining module 108 may check each feed element within each social networking data feed for the time that the feed element was submitted to the social networking data feed, for a time accompanying the feed element in the submission to the site (e.g., a creation time of the element represented in metadata by the social networking data feed), and/or time data embedded within the feed element (e.g., time metadata embedded within a photograph) specifying the creation time of the feed element. Likewise, mining module 108 may check each feed element for a location from which the feed element was submitted (e.g., based on a user-specified location, geolocation data accompanying the feed element submitted by the device, content of the feed element indicating the location, etc.).

The event data may include any of a variety of data elements. For example, the event data may include a social networking check-in at the event. As used herein, the term "check-in" may refer to any indication and/or assertion of an arrival and/or presence at a location. In some examples, a check-in may be automatically generated by a device and submitted to a social networking platform. Additionally or alternatively, a check-in may be user-initiated. The event data may additionally or alternatively include a picture taken at the event, a video taken at the event, a social networking post created at the event, and/or a social networking post created about the event. In some examples, the social networking post created about the event may have been created before or after the event but may reference the event.

As mentioned earlier, in some examples the plurality of social networking data feeds may include one or more public data feeds and/or one or more private data feeds. Accordingly, in some examples mining module 108 may mine a private social networking data feed for the event data and mine at least one public social networking data feed for the event data. For example, the private social networking data feed may be owned by a user requesting to create an event document of the event. Additionally or alternatively, the private social networking data feed may include a data feed accessible only to a limited group. For example, the private social networking data feed may include a data feed accessible to a user (and, by extension, the systems described herein) only because the user creating the event document has a defined social connection with another user with permissions to the private social networking data feed.

Using FIG. 4 as an example, mining module 108 may mine feed 410 and extract check-in 412, picture 414, and post 416 as event data, while ignoring a post 418 as outside the timeframe of event 402. Likewise, mining module 108 may mine feed 420 and extract pictures 426, 428, and 430 as event data, while ignoring pictures 422, 432, and 434 as outside the timeframe of event 402 and ignoring a picture 424 as outside a location of event 402. Similarly, mining module 108 may mine feed 440 and extract a video 444 as event data but ignore a post 442 as outside a timeframe of event 402. However, in some examples mining module 108 may also extract a post 446 as event data based on the proximity of post 446 to the timeframe of event 402 and the content of post 446 referring to event 402 (e.g., discussing event 402 after event 402 has ended).

Returning to FIG. 3, at step 308 one or more of the systems described herein may create an event document from the event data to describe the event. For example, at step 308 creation module 110 may, as part of computing device 202 in FIG. 2, create an event document 240 from event data 230 to describe the event.

As used herein, the phrase "event document" may refer to any document, database, aggregated feed, and/or unified presentation. Creation module 110 may create the event document in any suitable manner. For example, creation module 110 may post the event data to at least one social networking site. In some examples, creation module 110 may create a static document (e.g., including pictures, posts, video, etc.) of the event. Additionally or alternatively, creation module 110 may create a dynamic presentation of the event. For example, creation module 110 may create a database from which features of the event may be searched and extracted. For example, creation module 110 may create an event document with event data elements sorted and/or filtered by contributor (e.g., which attendee submitted the data element), sorted by time, etc.

Figure 5:
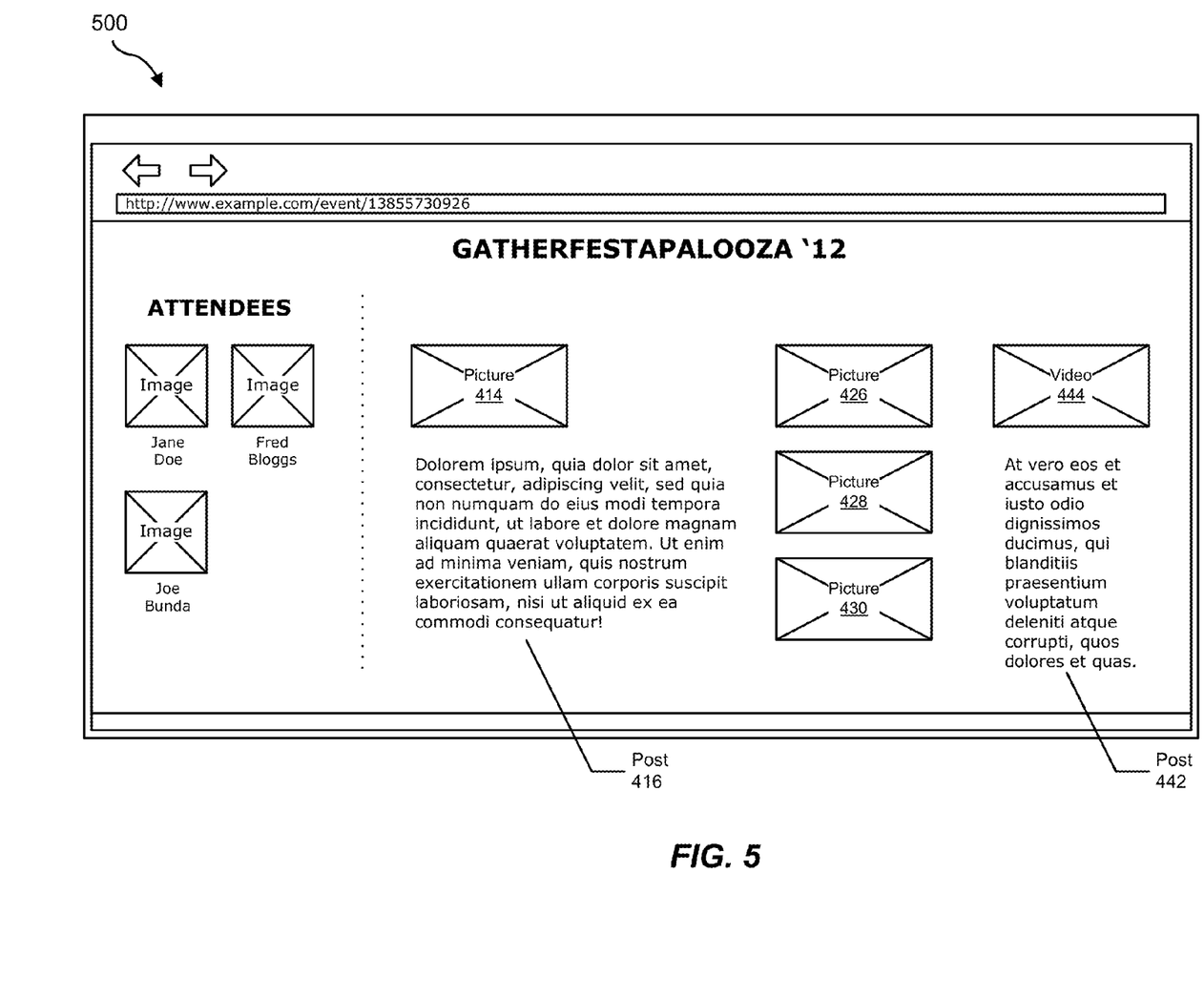
FIG. 5 is an illustration of an exemplary event document.

FIG. 5 illustrates an exemplary event document 500. As shown in FIG. 5, exemplary event document 500 may show the attendees of the event (e.g., the owners of feeds 410, 420, and 440 in FIG. 4) and/or data components of the feeds of the attendees of the event. For example, event document 500 may aggregate elements of feeds 410, 420, and 440 to show pictures 414, 426, 428, and 430, posts 416 and 442, and/or video 444.

As explained above, by mining information relating to an identified event (e.g., based on a determined time and location of the vent) from disparate social networking data feeds and combining the information into a unified document, the systems and methods described herein may leverage existing social networking activity to thoroughly and automatically chronicle events.

Figure 6:
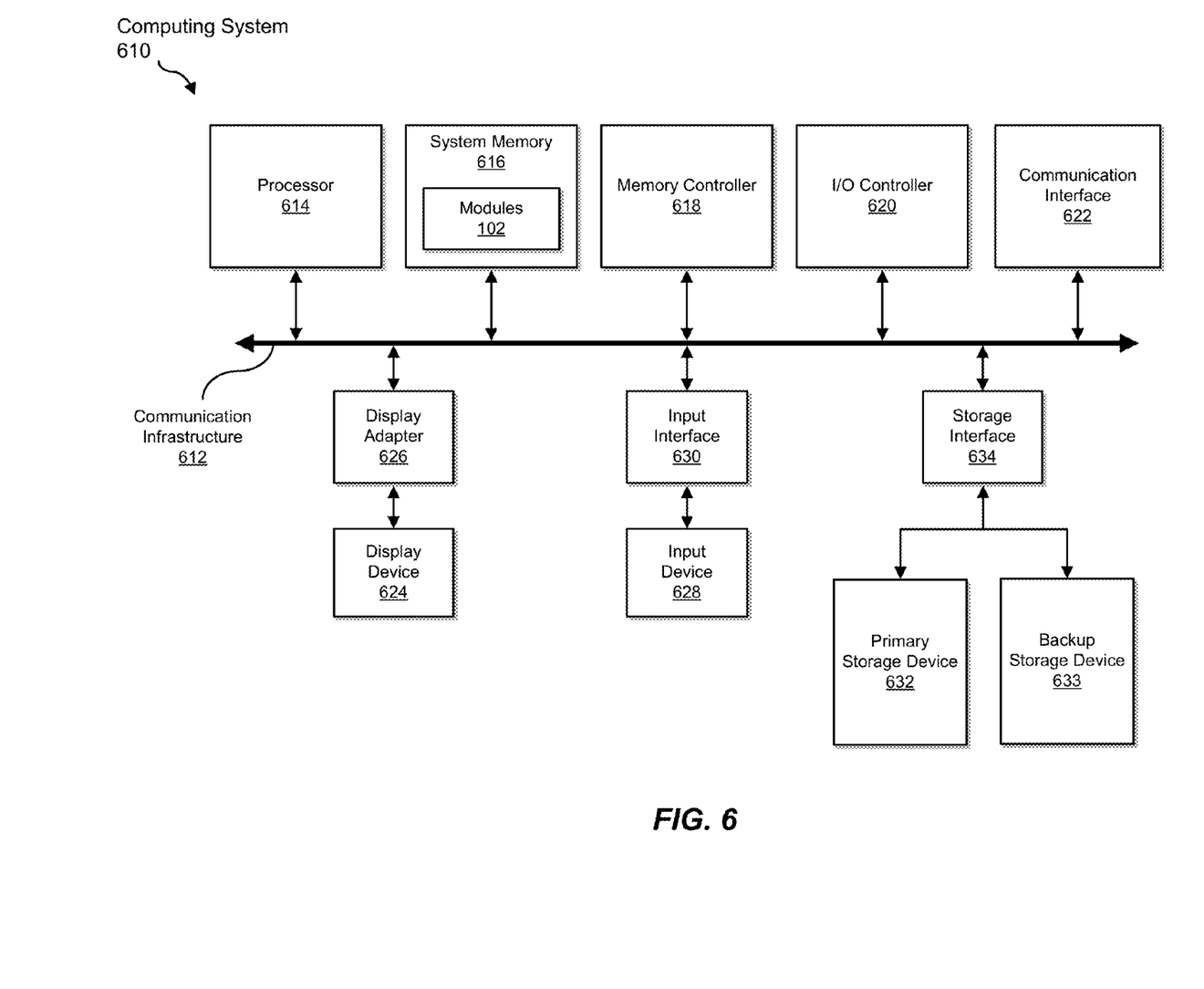
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, mining, creating, and posting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
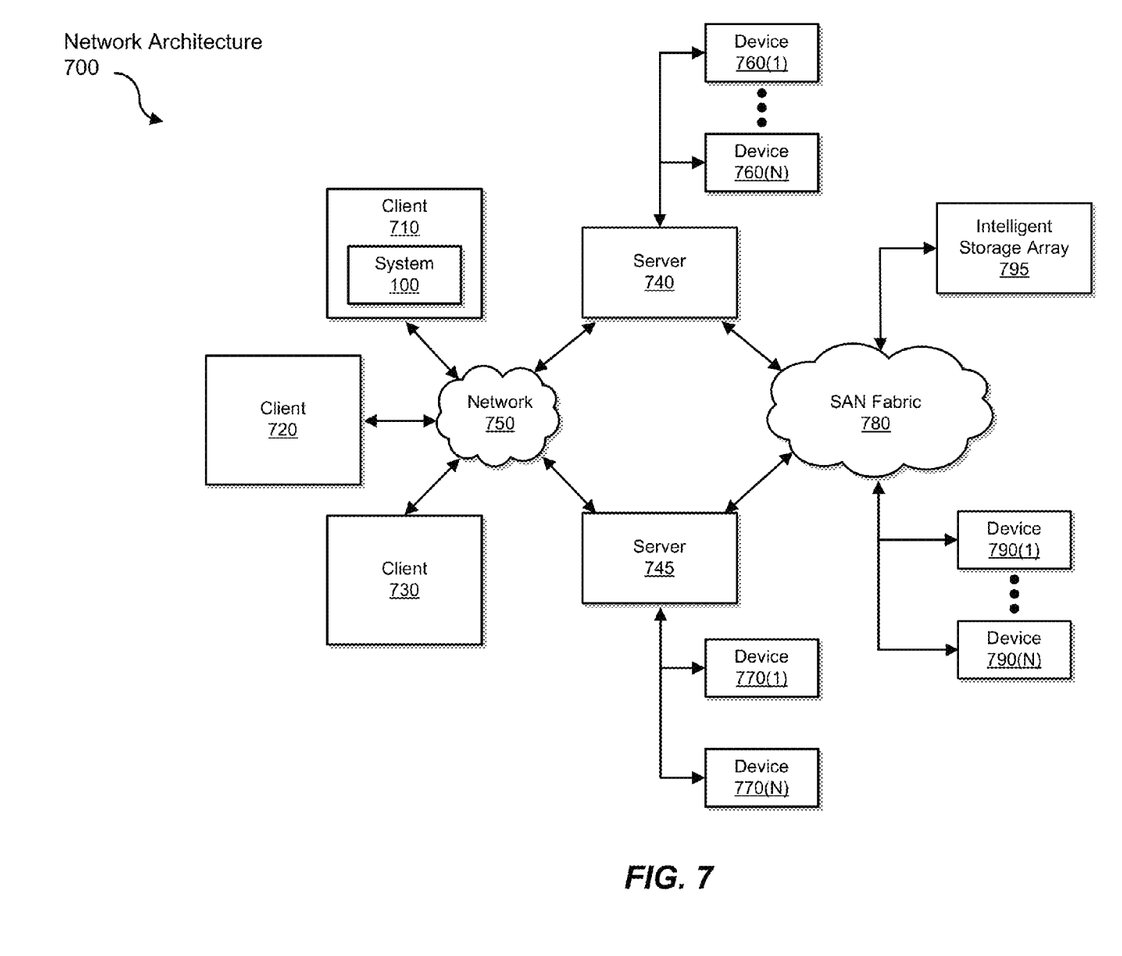
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, mining, creating, and posting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for aggregating event information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for aggregating event information. As another example, one or more of the modules recited herein may transform one or more social networking feeds into an event document.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for aggregating event information, at least a portion of the method being performed by a computing device comprising at least one hardware processor, the method comprising:
- identifying a plurality of social networking data feeds;
- identifying a planned event involving at least one person associated with at least one social networking data feed within the plurality of social networking data feeds;
- identifying a time and a location of the planned event;
- identifying, within a data feed from the plurality of social networking data feeds, a submission that corresponds to the planned event using at least one of:
  - the time of the planned event;
  - the location of the planned event;
- identifying, within an additional data feed from the plurality of social networking data feeds, an additional submission that corresponds to the planned event using at least one of:
  - the time of the planned event;
  - the location of the planned event;
- creating an event document from the submission within the data feed and the additional submission within the additional data feed to describe the planned event, wherein the step of creating the event document is performed by the computing device.

2. The computer-implemented method of claim 1, wherein identifying the time and the location of the planned event comprises mining the time and the location of the planned event from at least one of the plurality of social networking data feeds.

3. The computer-implemented method of claim 1, wherein identifying the time and the location of the planned event comprises identifying the time and location of the planned event within at least one of:
- an event invitation defined by a social networking platform used for at least one of the plurality of social networking data feeds;
- a calendar event defined by the social networking platform;
- an event announcement defined by the social networking platform.

4. The computer-implemented method of claim 1, wherein identifying the plurality of social networking feeds comprises:
- identifying at least one participant in the planned event;
- identifying at least one personal social networking feed associated with the participant.

5. The computer-implemented method of claim 4, wherein identifying the personal social networking feed associated with the participant comprises:
- identifying a root social networking feed;
- mining the root social networking feed for the personal social networking feed associated with the participant.

6. The computer-implemented method of claim 1, wherein the submission comprises at least one of:
- a social networking check-in at the planned event;
- a picture taken at the planned event;
- a video taken at the planned event;
- a social networking post created at the planned event;
- a social networking post created about the planned event.

7. The computer-implemented method of claim 1, wherein creating the event document comprises posting the submission and the additional submission to at least one social networking site.

8. The computer-implemented method of claim 1, wherein:
- identifying the submission that corresponds to the planned event comprises mining a private social networking data feed for the submission;
- identifying the additional submission that corresponds to the planned event comprises mining at least one public social networking data feed for the additional submission.

9. A system for aggregating event information, the system comprising:
- a feed module, stored in memory, that identifies a plurality of social networking data feeds;
- an identification module, stored in memory, that:
  - identifies a planned event involving at least one person associated with at least one social networking data feed within the plurality of social networking data feeds;
  - identifies a time and a location of the planned event;
- a mining module, stored in memory, that:
  - identifies, within a data feed from the plurality of social networking data feeds, a submission that corresponds to the planned event using at least one of:
    - the time of the planned event;
    - the location of the planned event;
  - identifies, within an additional data feed from the plurality of social networking data feeds, an additional submission that corresponds to the planned event using at least one of:
    - the time of the planned event;
    - the location of the planned event;
- a creation module, stored in memory, that creates an event document from the submission within the data feed and the additional submission within the additional data feed to describe the planned event;
- at least one hardware processor configured to execute the feed module, the identification module, the mining module, and the creation module.

10. The system of claim 9, wherein the identification module is programmed to identify the time and the location of the planned event by mining the time and the location of the planned event from at least one social networking data feed within the plurality of social networking data feeds.

11. The system of claim 9, wherein the identification module is programmed to identify the time and the location of the planned event by identifying the time and location of the planned event within at least one of:
- an event invitation defined by a social networking platform used for at least one of the plurality of social networking data feeds;
- a calendar event defined by the social networking platform;
- an event announcement defined by the social networking platform.

12. The system of claim 9, wherein the feed module is programmed to identify the plurality of social networking feeds by:
- identifying at least one participant in the planned event;
- identifying at least one personal social networking feed associated with the participant.

13. The system of claim 12, wherein the feed module is programmed to identify the personal social networking feed associated with the participant by:
- identifying a root social networking feed;
- mining the root social networking feed for the personal social networking feed associated with the participant.

14. The system of claim 9, wherein the submission comprises at least one of:
- a social networking check-in at the planned event;
- a picture taken at the planned event;
- a video taken at the planned event;

a social networking post created at the planned event;
a social networking post created about the planned event.

15. The system of claim 9, wherein the creation module is programmed to create the event document by posting the submission and the additional submission to at least one social networking site.

16. The system of claim 9, wherein the mining module is programmed to:
- identify the submission that corresponds to the planned event by
- mining a private social networking data feed for the submission;
- identify the additional submission that corresponds to the planned event by mining at least one public social networking data feed for the additional submission.

17. A non-transitory computer-readable-storage medium comprising one or more computer-executable instructions that, when executed by at least one processor of a computing device, cause the computing device to:
- identify a plurality of social networking data feeds;
- identify a planned event involving at least one person associated with at least one social networking data feed within the plurality of social networking data feeds;
- identify a time and a location of the planned event;
- identify, within a data feed from the plurality of social networking data feeds, a submission that corresponds to the planned event using at least one of:
  - the time of the planned event;
  - the location of the planned event;
- identify, within an additional data feed from the plurality of social networking data feeds, an additional submission that corresponds to the planned event using at least one of:
  - the time of the planned event;
  - the location of the planned event;
- create an event document from the submission within the data feed and the additional submission within the additional data feed to describe the planned event.

18. The computer-readable-storage medium of claim 17, wherein the one or more computer-executable instructions cause the computing device to identify the time and the location of the planned event by causing the computing device to mine the time and the location of the planned event from at least one social networking data feed within the plurality of social networking data feeds.

19. The computer-readable-storage medium of claim 17, wherein the one or more computer-executable instructions cause the computing device to identify the time and the location of the planned event by causing the computing device to identify the time and location of the planned event within at least one of:
- an event invitation defined by a social networking platform used for at least one of the plurality of social networking data feeds;
- a calendar event defined by the social networking platform;
- an event announcement defined by the social networking platform.

20. The computer-readable-storage medium of claim 17, wherein the one or more computer-executable instructions cause the computing device to identify the plurality of social networking feeds by causing the computing device to:
- identify at least one participant in the planned event;
- identify at least one personal social networking feed associated with the participant.

\* \* \* \* \*